United States Patent [19]
Bradfute et al.

[11] Patent Number: 5,984,080
[45] Date of Patent: Nov. 16, 1999

[54] ARMATURE TRANSFER APPARATUS

[75] Inventors: John W. Bradfute, Greene County; Patrick A. Dolgas, Milford; Mark T. Heaton, Springfield, all of Ohio

[73] Assignee: Globe Products Inc., Huber Heights, Ohio

[21] Appl. No.: 09/110,559

[22] Filed: Jul. 6, 1998

Related U.S. Application Data

[60] Division of application No. 08/719,201, Sep. 24, 1996, Pat. No. 5,774,963, which is a continuation-in-part of application No. 08/717,283, Sep. 20, 1996
[60] Provisional application No. 60/041,608, Sep. 20, 1996, abandoned.

[51] Int. Cl.$^6$ ................................................ B65G 25/04
[52] U.S. Cl. ........................................ 198/409; 198/346.2
[58] Field of Search ................................ 198/346.2, 409, 198/468.2

[56] References Cited

U.S. PATENT DOCUMENTS

| | | | |
|---|---|---|---|
| 3,968,885 | 7/1976 | Hassan et al. | 414/591 |
| 4,012,834 | 3/1977 | Le Vasseur | 29/597 |
| 4,081,072 | 3/1978 | Le Vasseur | 198/394 |
| 4,087,054 | 5/1978 | Finegold | 242/433 |
| 4,459,742 | 7/1984 | Banner | 29/597 |
| 4,553,321 | 11/1985 | Zihlmann et al. | 29/598 |
| 4,633,577 | 1/1987 | Banner | 29/597 |
| 4,654,955 | 4/1987 | Mathie | 483/19 |
| 4,775,271 | 10/1988 | Maccaferri | 414/225 |
| 4,982,827 | 1/1991 | Seitz et al. | 198/341.07 |
| 5,253,912 | 10/1993 | Andorlini et al. | 294/119.1 |
| 5,257,689 | 11/1993 | Lombardi et al. | 198/468.2 |
| 5,330,043 | 7/1994 | Stuckey | 198/346.2 |
| 5,372,319 | 12/1994 | Dolgas | 242/433.4 |
| 5,391,047 | 2/1995 | Dolgas | 414/751 |
| 5,494,230 | 2/1996 | Dolgas | 242/433.4 |
| 5,525,774 | 6/1996 | Dolgas et al. | 219/89 |
| 5,653,014 | 8/1997 | Faraoni et al. | 29/732 |
| 5,680,696 | 10/1997 | Bonura et al. | 29/732 |

FOREIGN PATENT DOCUMENTS 707 373   4/1996   European Pat. Off. .

OTHER PUBLICATIONS

Brochure titled "MDF–4000" published 1985 by the Globe Tool and Engineering Co., Dayton, Ohio.
Brochure titled "MDF 6000" published 1985 by the Globe Tool and Engineering Co., Dayton, Ohio.

*Primary Examiner*—Andrew C. Pike
*Attorney, Agent, or Firm*—Roger S. Dybvig

[57] ABSTRACT

An armature manufacturing line includes one or more manufacturing cells, each having a winder facing a fuser and a rotatable armature transfer apparatus that transfers unwound armatures to the winder and wound armatures from the winder directly to the fuser. The armature transfer apparatus has a rotatable turret upon which are mounted a pair of grippers that face in mutually opposite directions and which are movable along mutually parallel axes. Independent drive means drives the grippers along their respective paths of movement relative to the turret. The turret is rotatably driven through 180° in alternately opposite directions to place one gripper in confronting relation with the winder, then in confronting relation with the fuser, and so on. An elevator at the fuser moves wound and fused armatures from the fuser to a conveyor. Different embodiments are disclosed.

11 Claims, 15 Drawing Sheets

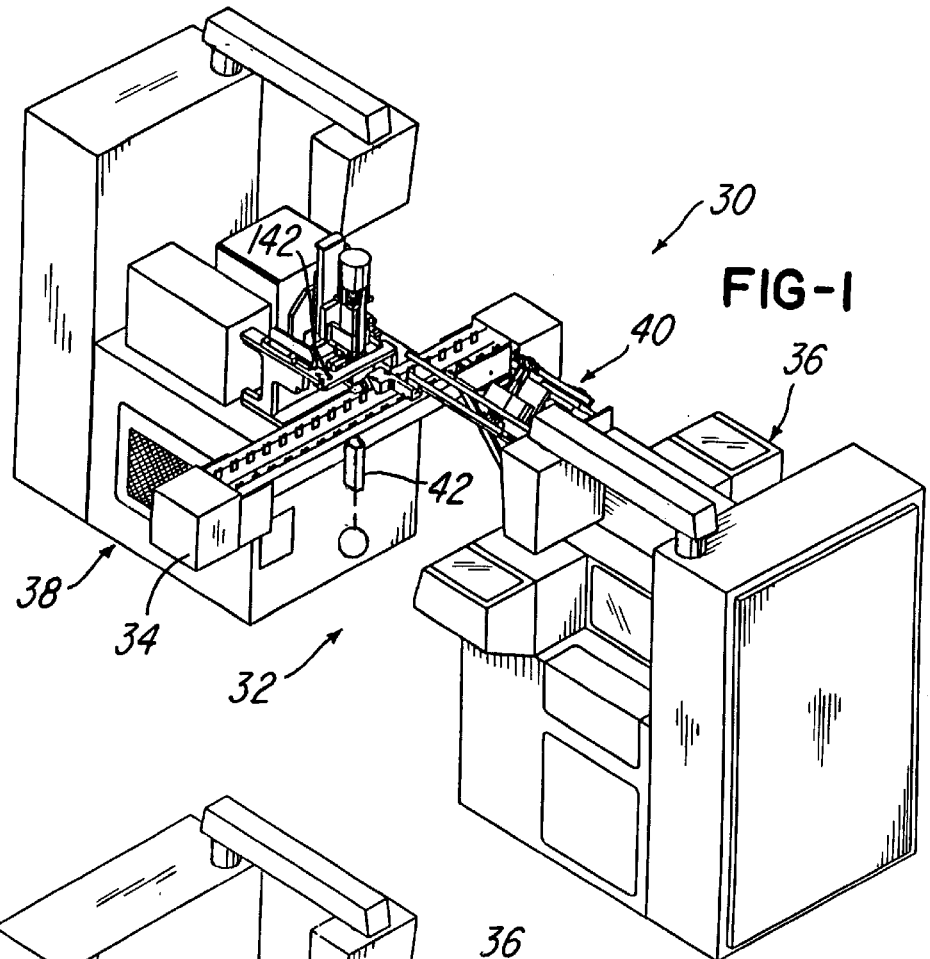
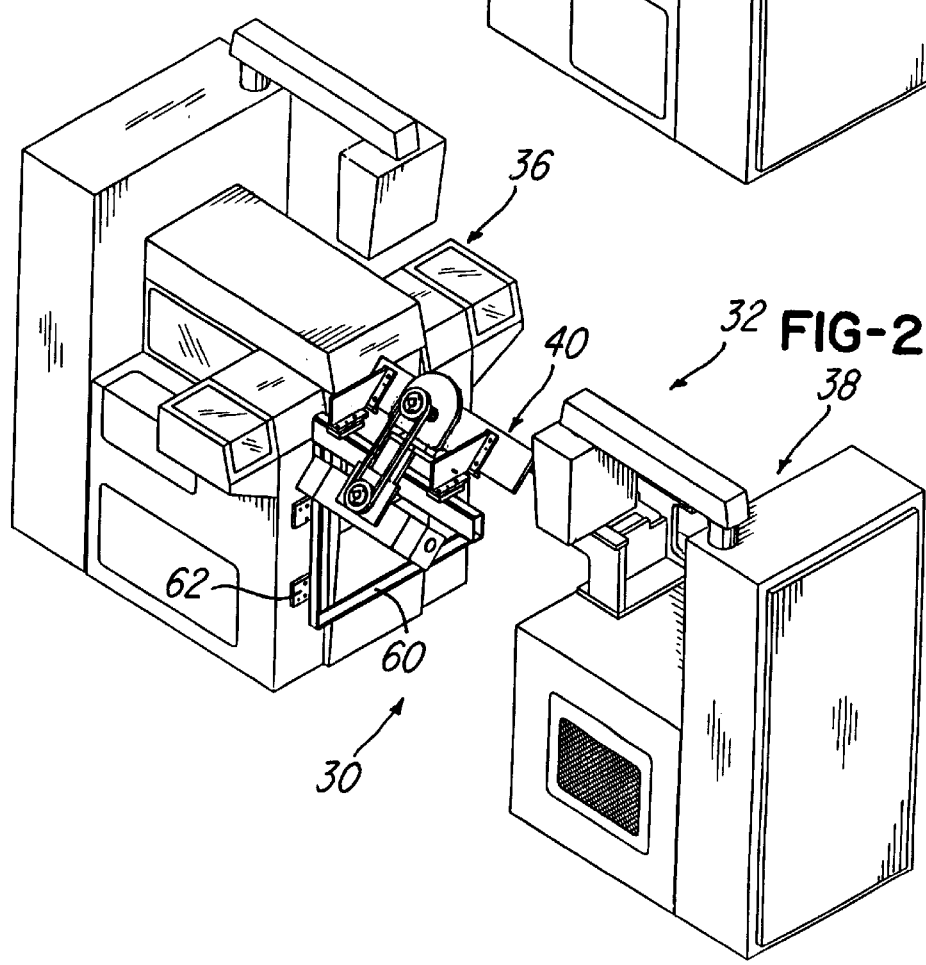

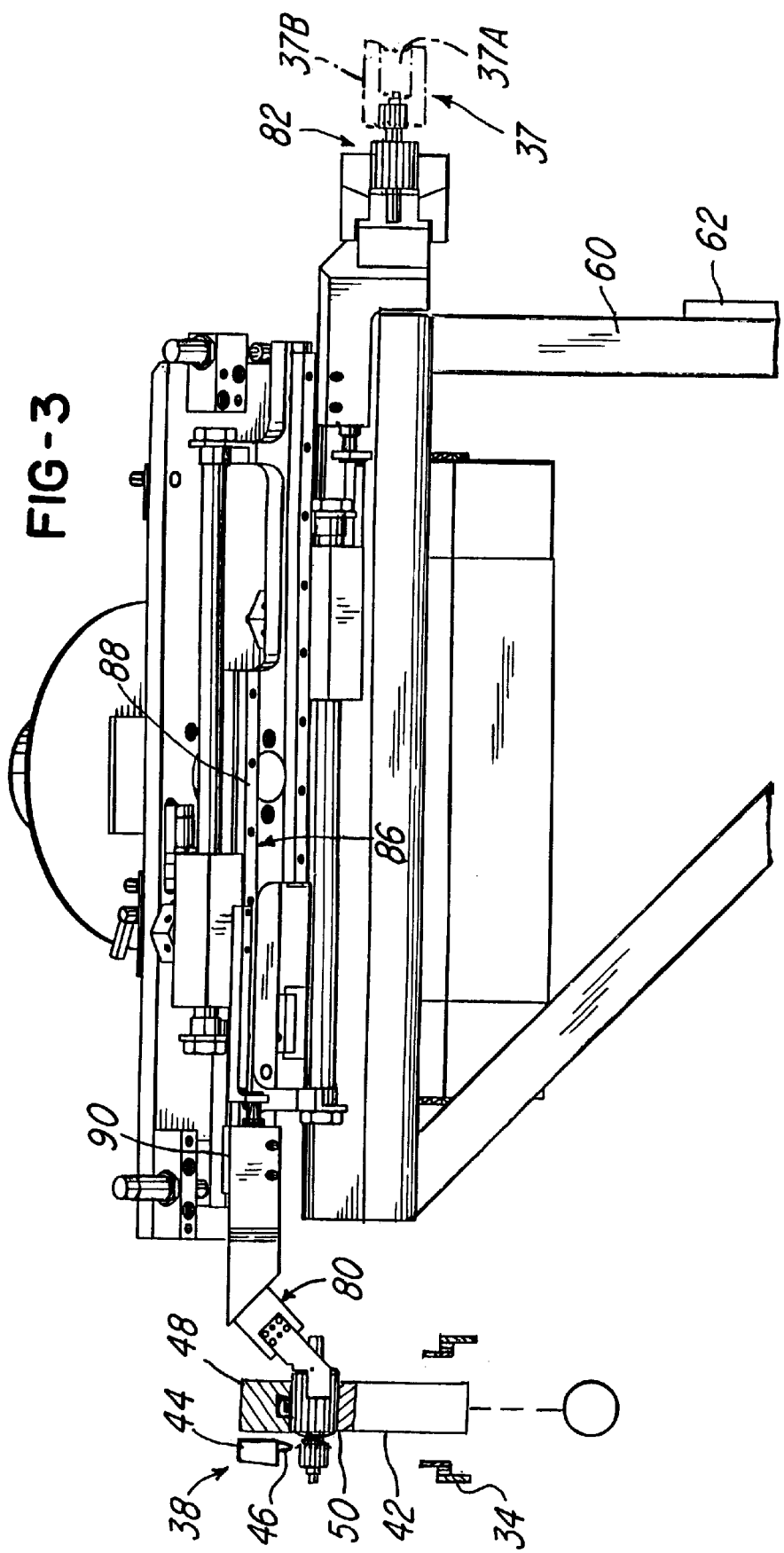

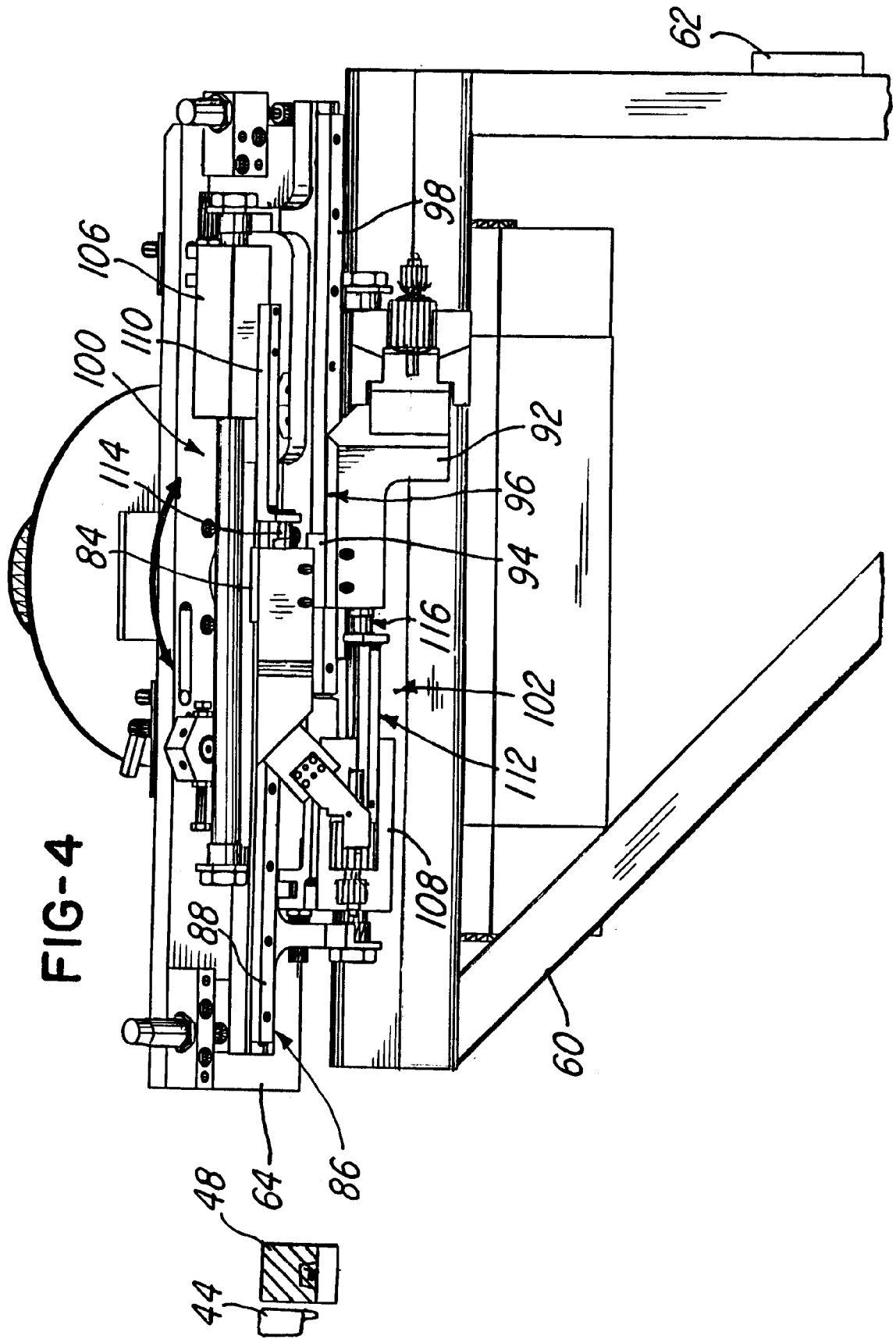

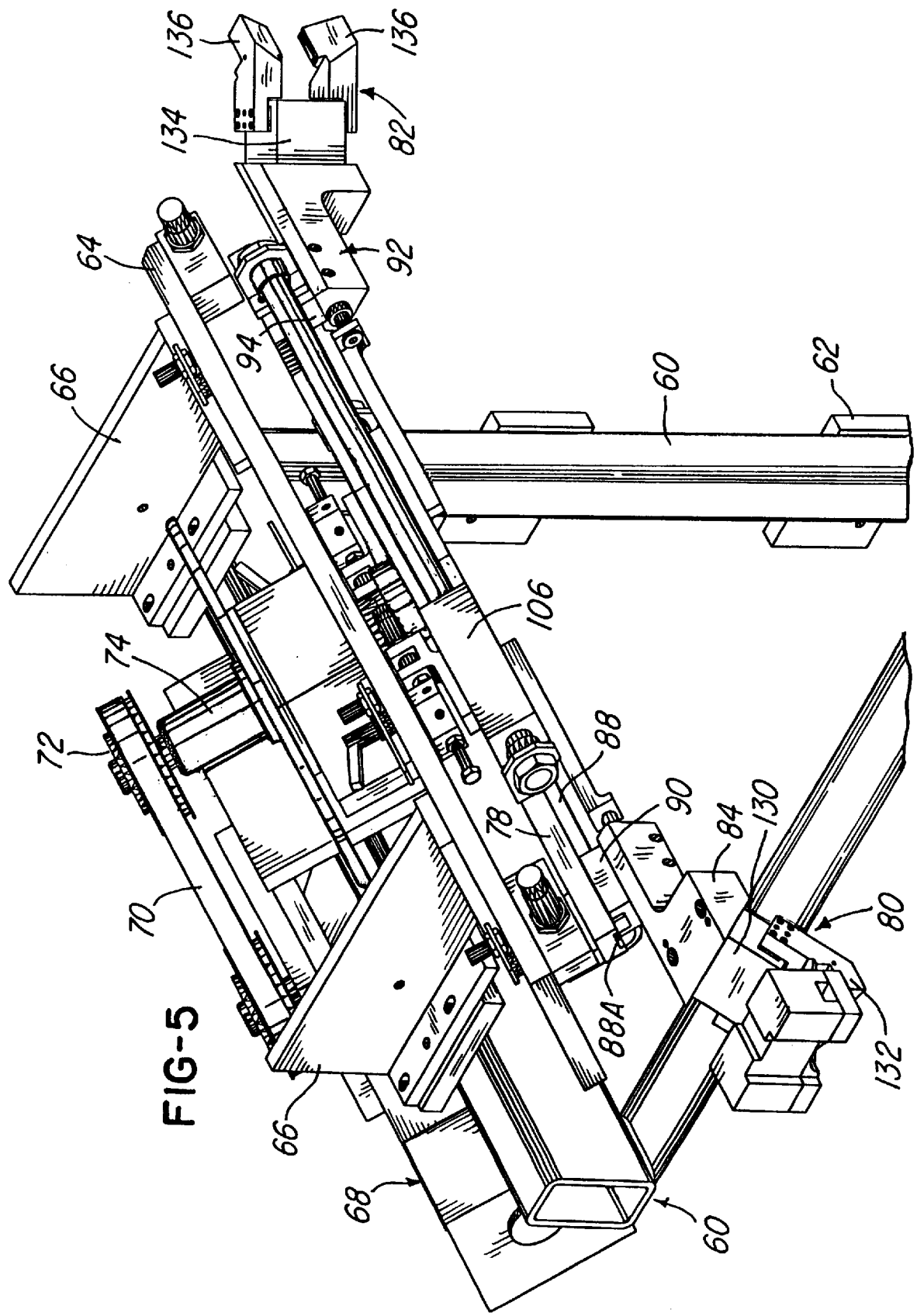

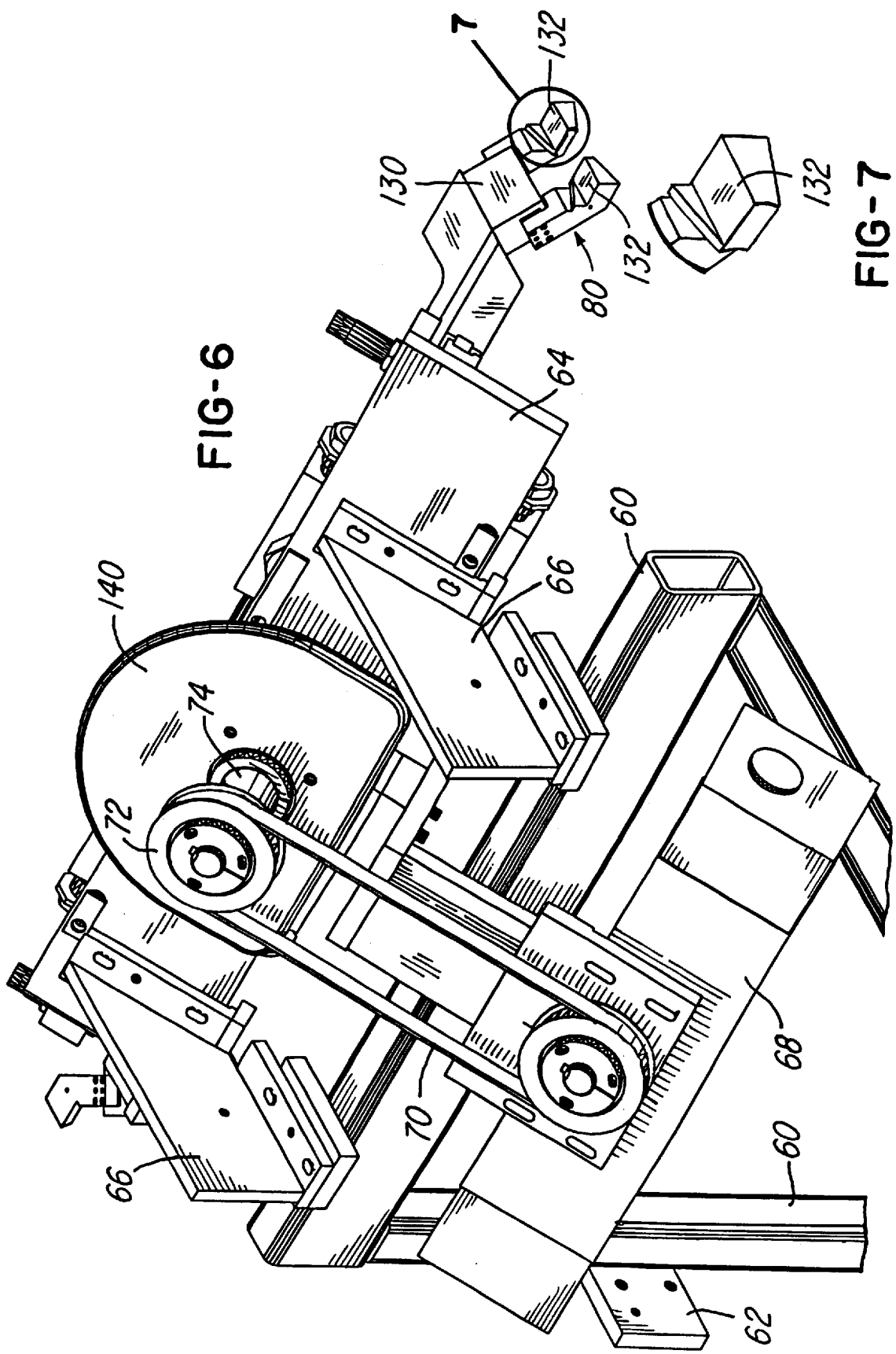

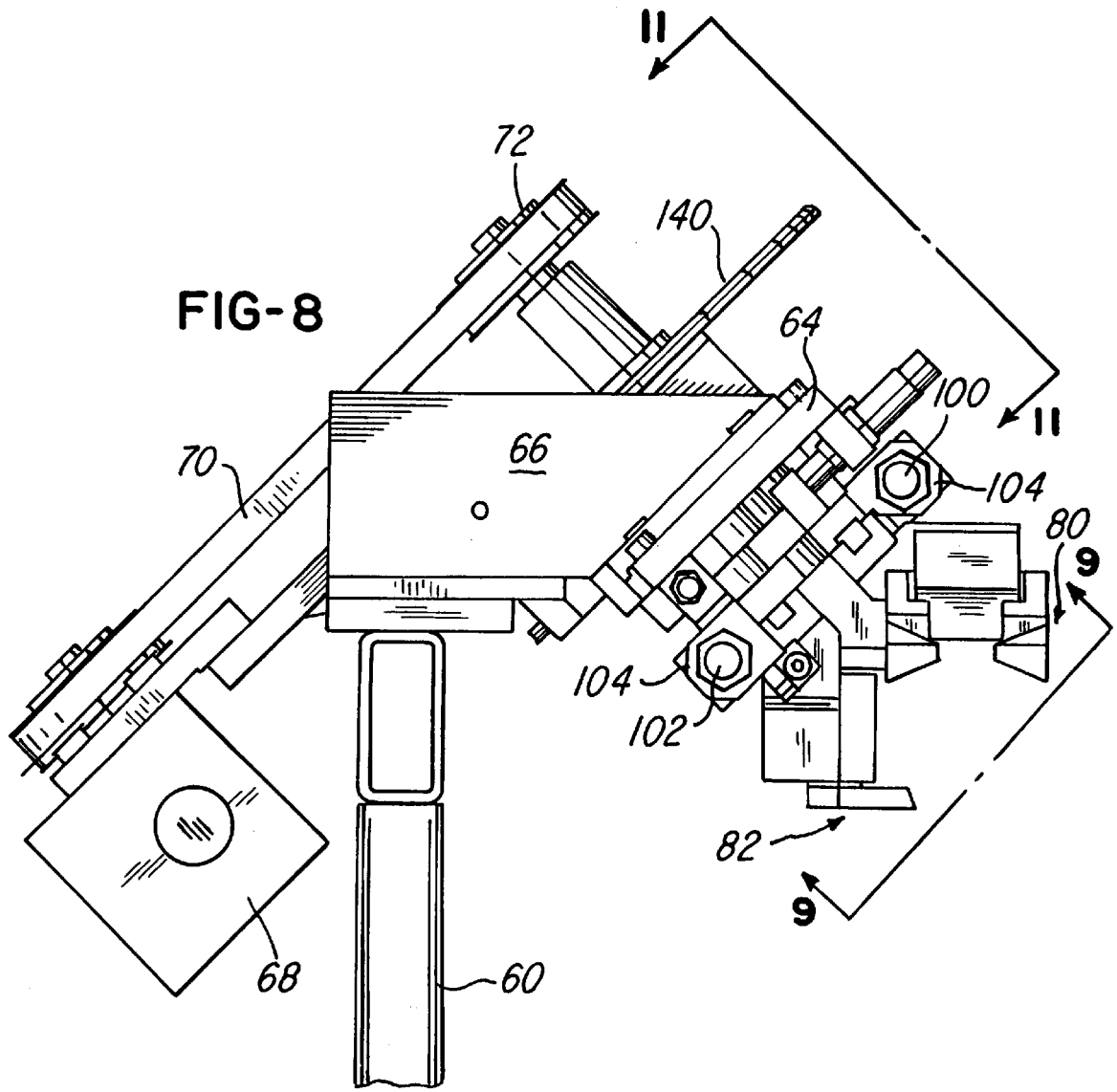

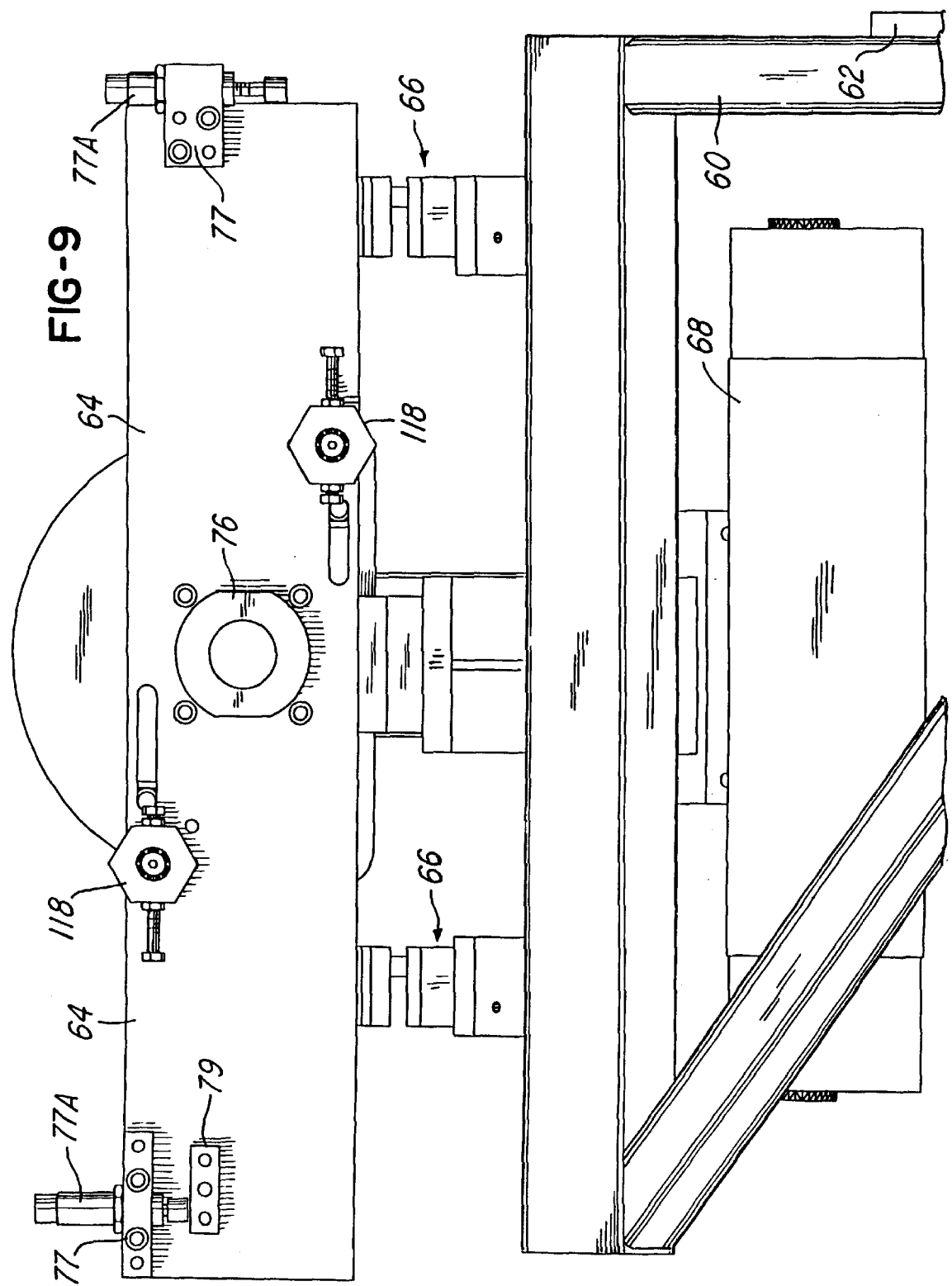

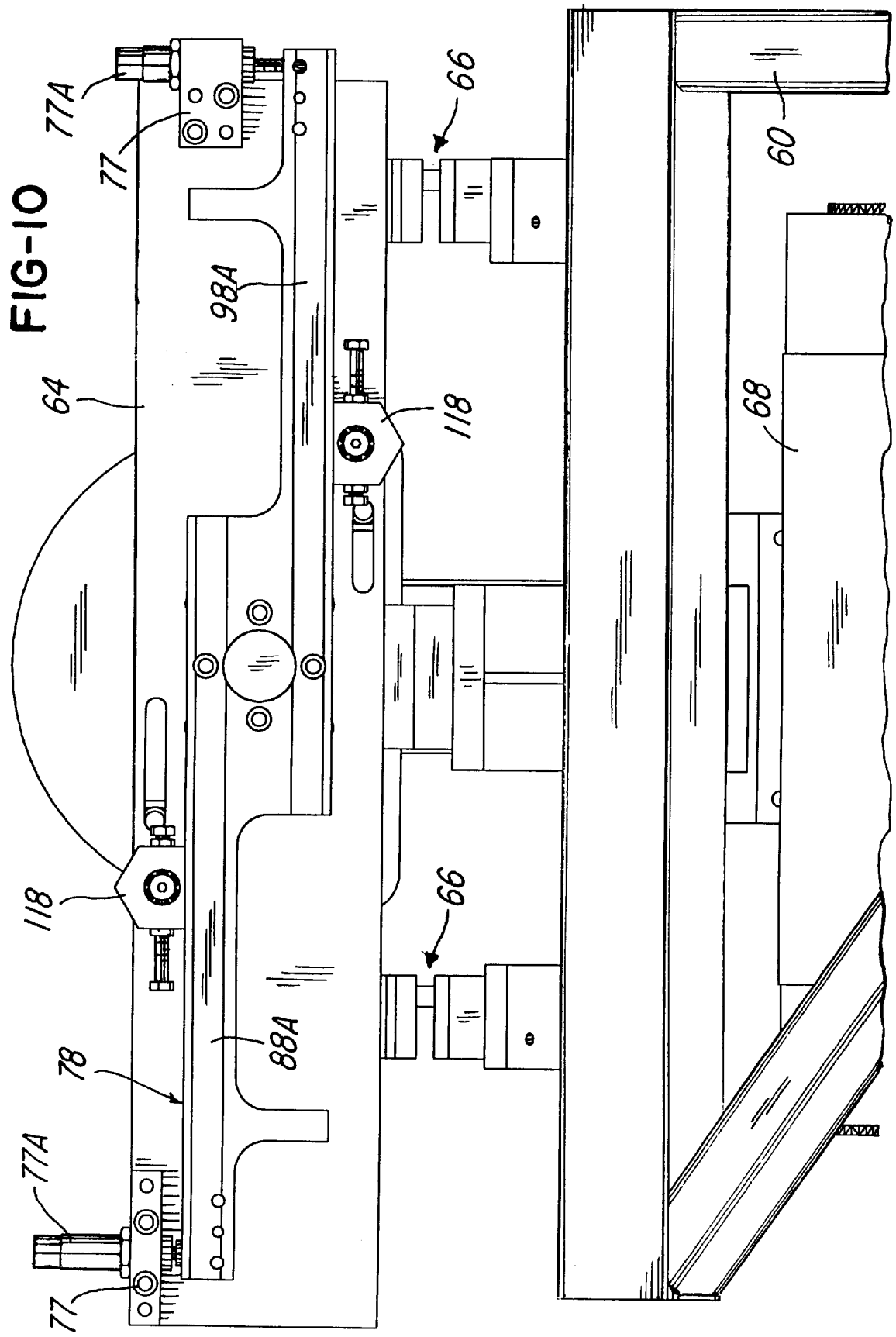

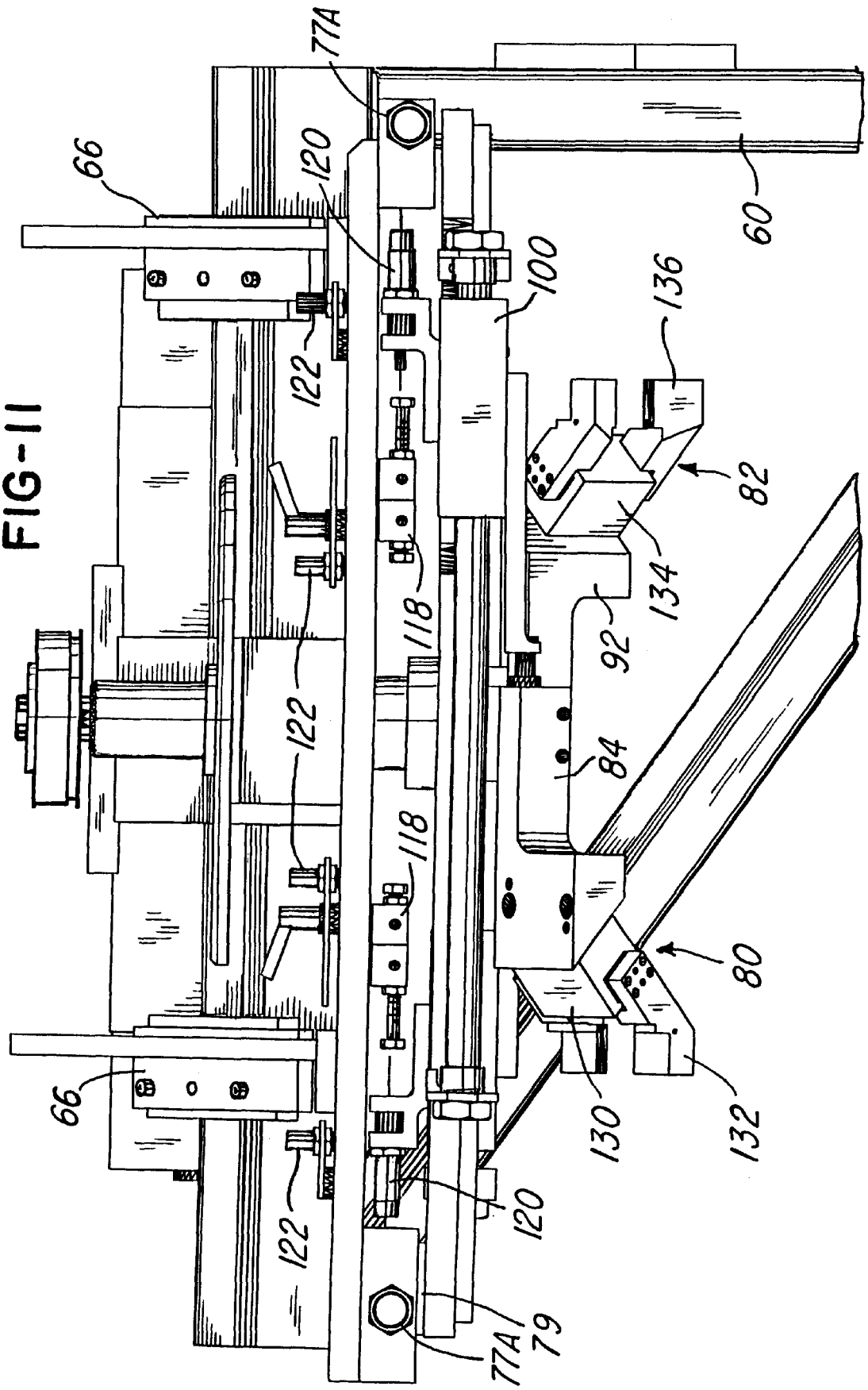

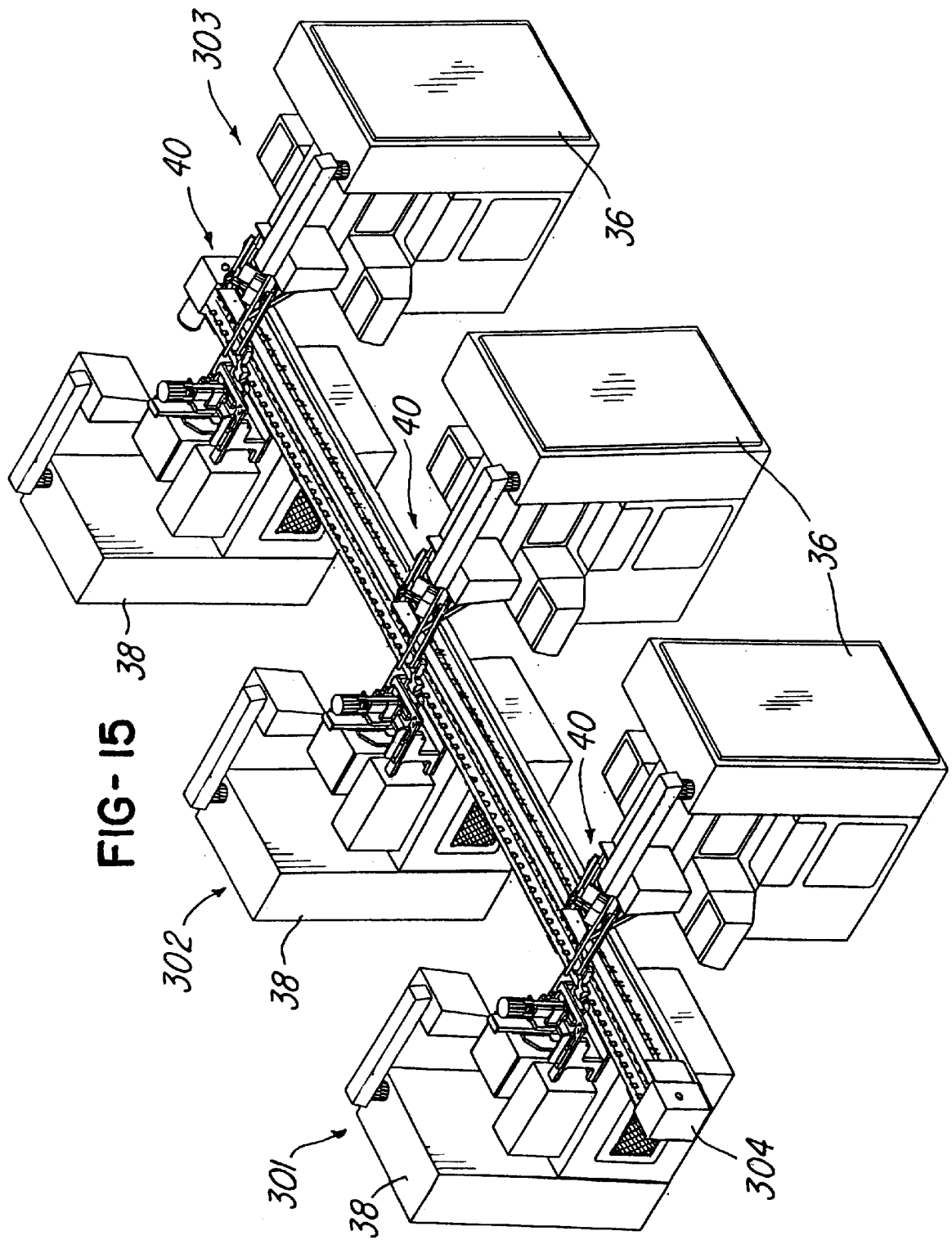

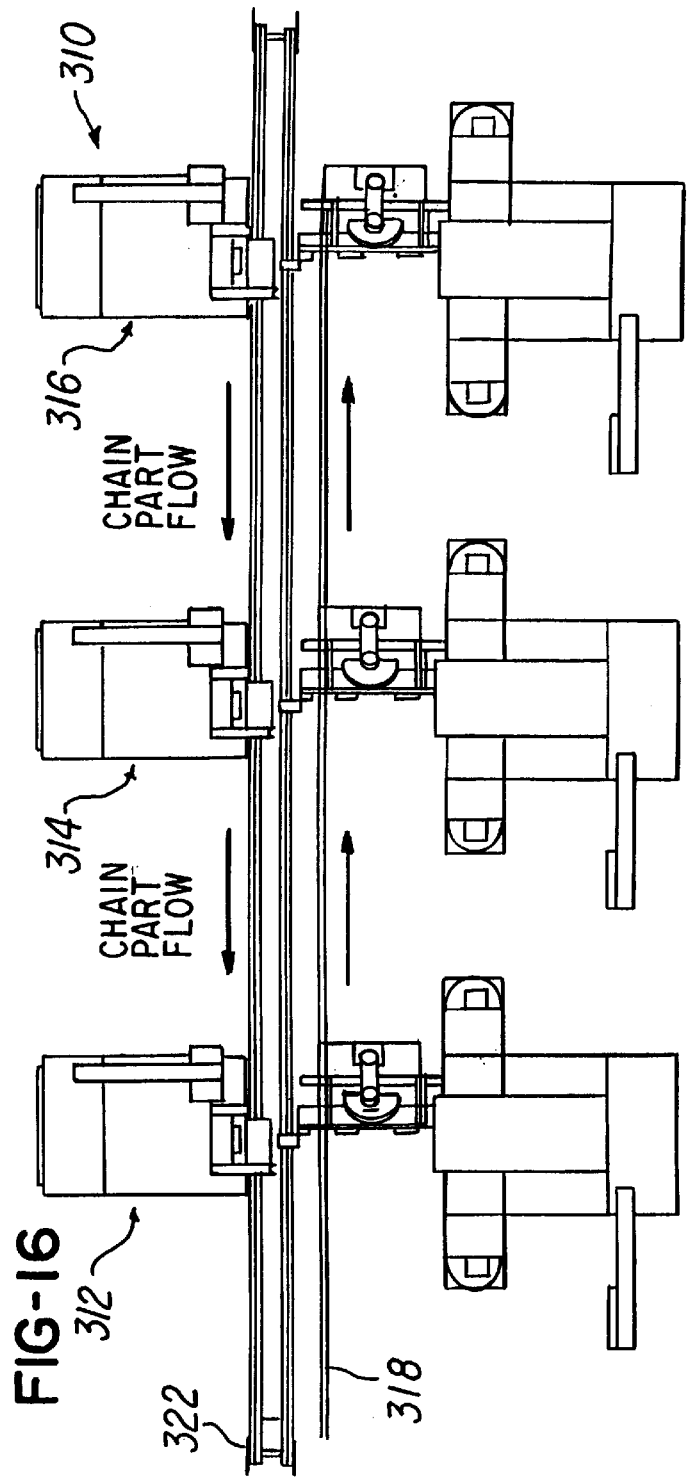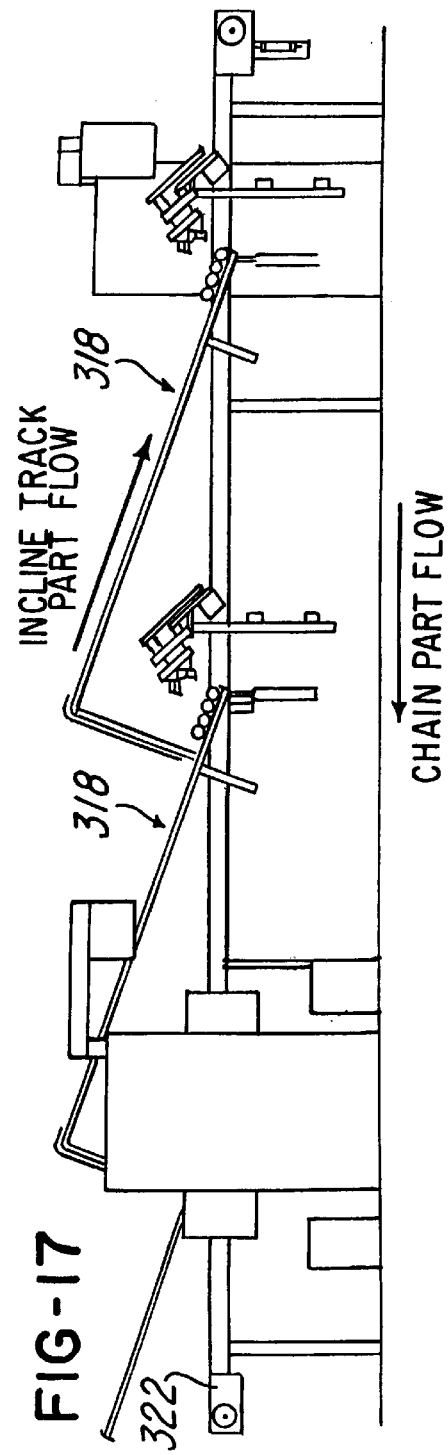

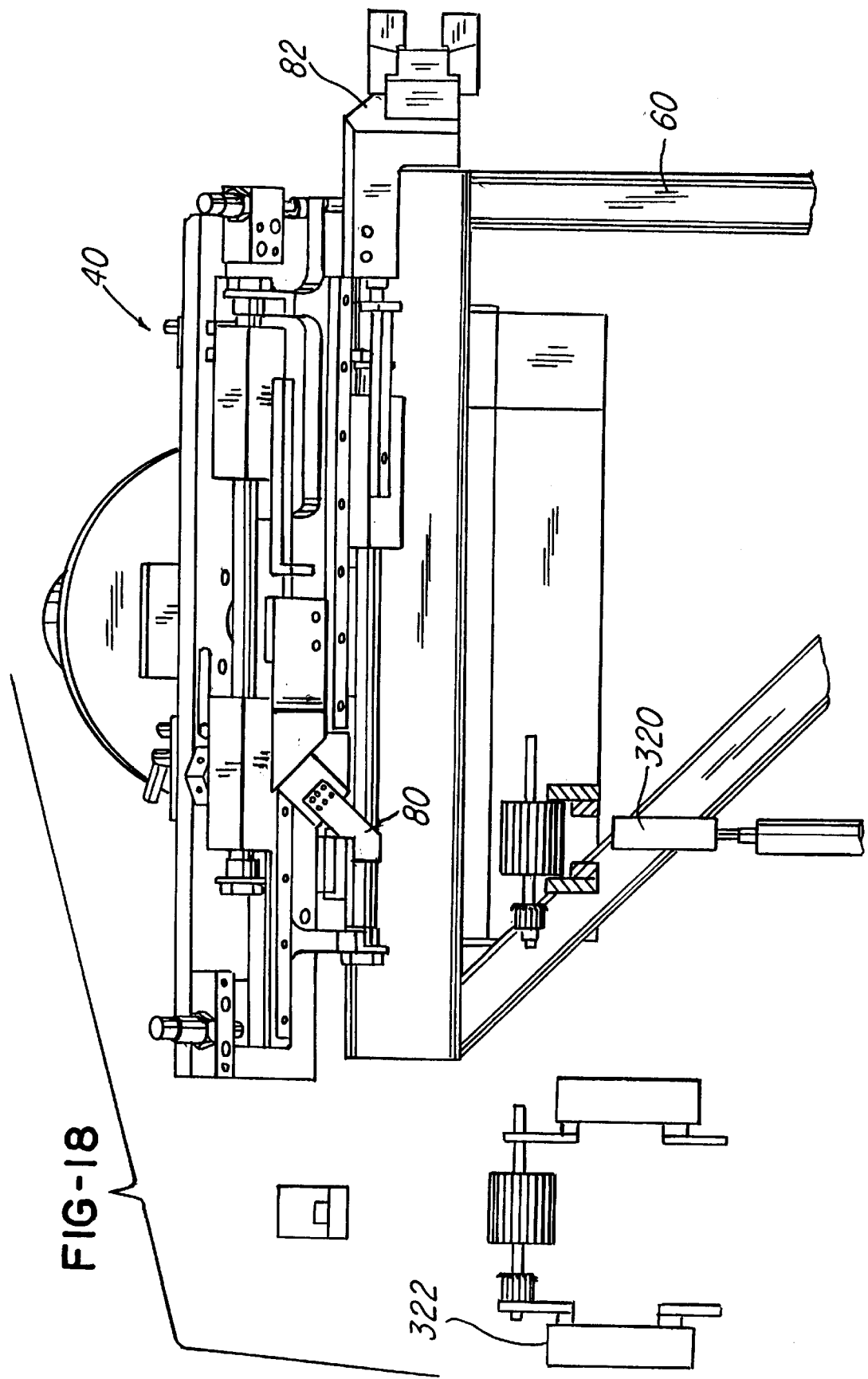

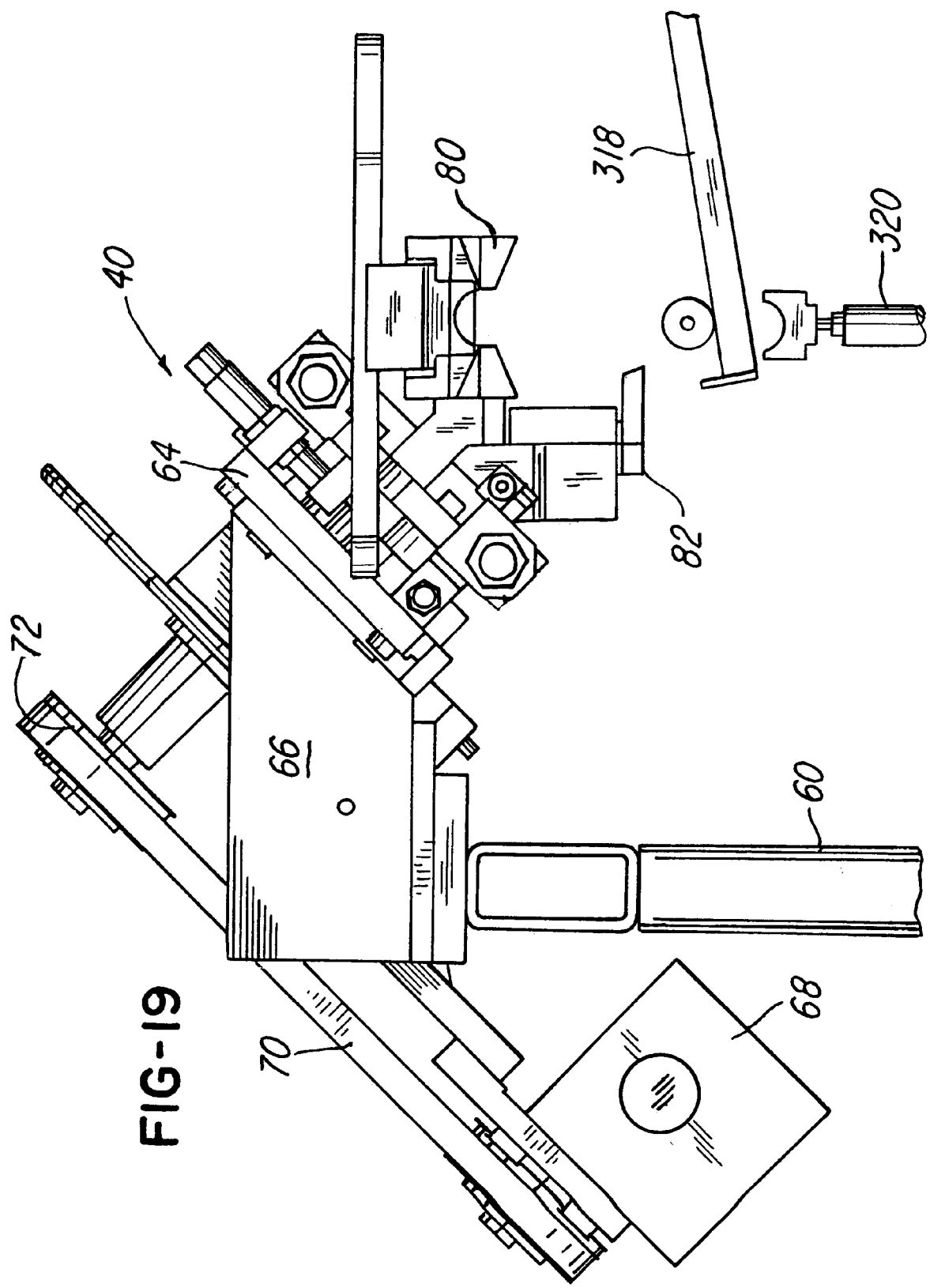

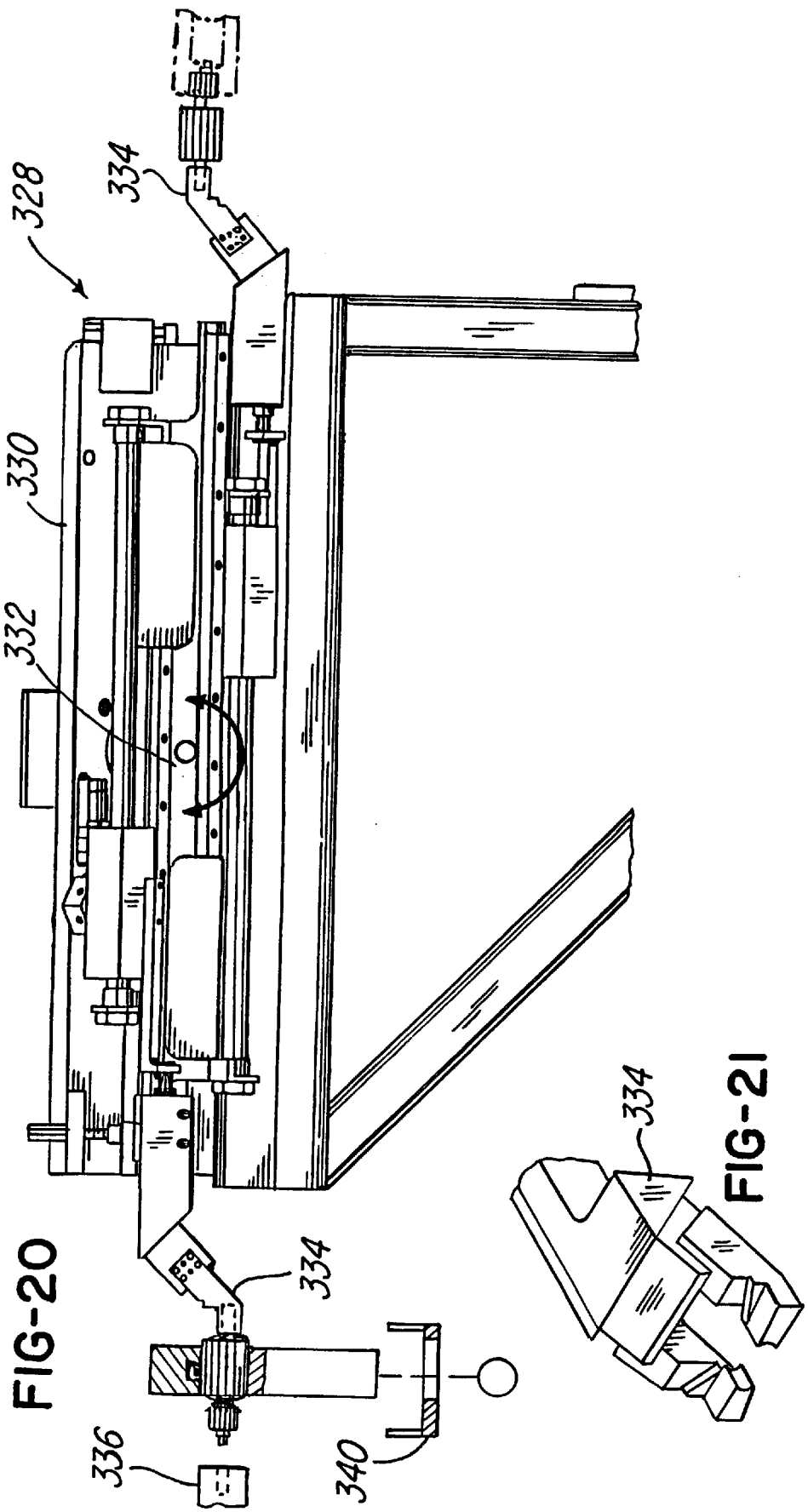

ARMATURE TRANSFER APPARATUS

CROSS-REFERENCE TO RELATED APPLICATION

This application is a divisional of U.S. application Ser. No. 08/719,201 filed Sep. 24, 1996, now U.S. Pat. No. 5,774,963, which is a continuation-in-part of U.S. application Ser. No. 08/717,283 filed Sep. 20, 1996 later converted to a provisional application Ser. No. 60/041,608 filed Sep. 20, 1996 now abandoned.

FIELD OF THE INVENTION

This invention relates to armature manufacturing lines including armature transfer apparatus for producing armatures for small electric motors, such as fractional horsepower universal motors. With appropriate modifications, aspects of this invention may be applied to the manufacture of devices other than electric motor armatures.

INCORPORATION BY REFERENCE

The disclosures of the following U.S. patents are incorporated by reference herein:

Banner, No. 4,633,577, granted Jan. 6, 1987

Seitz et al., No. 4,982,827, granted Jan. 8, 1991

Dolgas, No. 5,372,319, granted Dec. 13, 1994

Dolgas et al., No. 5,525,774, granted Jun. 11, 1996

Bradfute et al., No. 5,774,963, granted Jul. 7, 1998.

BACKGROUND OF THE INVENTION

The manufacture of an armature for an electric motor typically begins with the formation of an armature subassembly including a commutator and a laminated core mounted on an armature shaft with appropriate insulating sleeves between the core and the commutator and between the opposite ends of the armature shaft and the core and the commutator. The commutator has plural bars, each of which has a coil lead wire-receiving portion, such as a hook-like tang or a slot. The core has outwardly opening, coil-receiving slots, insulating laminations or coatings at each end of the core, and insulators lining the coil-receiving slots. The armature subassembly thus formed is loaded into an armature winder which winds coils of insulation-coated magnet wire into the core slots and connects coil leads extending to and from the coils to the lead wire-receiving portions of the commutator bars. Following completion of the winding and lead-connecting operations, the armature subassembly is removed from the armature winder and transferred to a machine known as a fuser or hot staker which permanently connects the coil leads to the commutator bars by application of heat and pressure to the commutator bars which burns off the insulating coating from the magnet wire in the areas of the connections to the commutator bars and fuses the commutator bars and wire leads together.

For purposes of the following specification including the claims, the term "armature", including both singular and plural forms, is used to refer to unwound armature subassemblies described above as well as to wound subassemblies and to wound and fused subassemblies, unless a contrary usage is evident.

Armatures often have to be produced in vast quantities at low costs and there is always a need for low cost yet reliable methods and apparatus for manufacturing armatures at a high rate of speed. This need has led to the development of armature manufacturing lines having conveyors for transporting unwound armatures to armature winding machines, then to fusers and then to unload stations or to other processing stations, such as wedge inserting, balancing and testing stations. Conveyors used in these procedures include simple inclined supply tracks, chain conveyors, or pallet conveyors of varying degrees of sophistication. Various armature handling devices, such as elevators and transfer or loading and unloading devices are used at the several processing stations for presenting the armatures to the processing machines and for removing the armatures from the processing machines.

Armature manufacturing apparatus have been used which have a rotating turret plate upon which are mounted armature loading and unloading devices that operate to grip an unwound armature lifted off a conveyor by an elevator and, after rotation of the turret plate through 180°, insert the unwound armature into a winding machine collet. After the winding of the armature is completed, the armature is again gripped by the gripping device and removed from the winding machine. Then, after the turret indexes through an additional 90°, the gripping device inserts the newly wound armature into a fusing machine after which the gripping device grips the newly wound and fused armature and retracts it from the fuser. The turret plate is indexed to return the wound and fused armature to the load station at which time the gripping device is extended to move the newly wound and fused armature onto the elevator which returns it to the conveyor. A conveyor and elevator such as the type disclosed in the aforementioned U.S. Pat. No. 4,982,827 has been used for this purpose. The turreted winding and fusing machine was of the type sold by The Globe Tool and Engineering Company of Dayton, Ohio, a predecessor of the assignee of the present invention, under its model designation MDF 6000.

Another example of the use of a rotating turret plate for handling armatures is disclosed in U.S. Pat. No. 4,087,054. In this case the turret plate carries two gripping mechanisms mounted on sliders and driven between retracted positions near the center of the turret plate and extended positions near the ends of the turret plate. The turret plate reversely rotates through successive 180° increments to position the gripping mechanisms in confronting relation alternately to a pallet and to an armature winder. When extended, the gripping mechanisms either remove armatures from or insert armatures into the pallet or the armature winder. The gripping mechanisms of U.S. Pat. No. 4,087,054 include collets and shields which are used at the winding station to assist in the winding of the armatures.

In another prior art manufacturing line sold by The Globe Tool and Engineering Company, an unwound armature, which has rolled down along an inclined supply track to a pick-up point to the right of an armature winder, is clamped by a clamp assembly carried by a pivoting arm and, following pivotal movement of the arm, inserted into the armature winder. The pivoting arm is pivoted back to pick up the next unwound armature at the bottom of the track. After the winding is completed, a second transfer mechanism having two grippers transfers the wound armature from the winder to a fuser located above and to the left of the winder, and simultaneously transfers a wound and fused armature to a chain conveyor having a load station located adjacent the fuser.

Various armature manufacturing systems using pallets for carrying armatures to different processing stations have been used. An example of such a system, which also includes an armature loading and unloading apparatus, is shown in the aforementioned U.S. Pat. No. 5,372,319.

SUMMARY OF THE INVENTION

An object of this invention is to provide a reliable, relatively inexpensive, armature manufacturing line with which armatures can be made at a high rate of speed. A further object is to provide such a manufacturing line that requires a minimum of floor space. A related object is to provide a novel armature manufacturing cell for use in armature manufacturing lines.

In accordance with this invention, conveyor means are provided to supply an unwound armature to an armature manufacturing cell and to remove wound and fused armatures from the manufacturing cell. The manufacturing cell includes an armature winder and a fuser, both of which have means for gripping an armature shaft during their respective processing operations, and an armature transfer apparatus. The winder and the fuser face each other so that their gripping means function to hold the armatures being processed thereby on mutually parallel or coaxial axes.

The armature transfer apparatus has a rotatable turret upon which are mounted a pair of grippers that face in mutually opposite directions and which are movable along mutually parallel axes. Independent drive means drives the grippers along their respective paths of movement relative to the turret. The turret is rotatably driven through 180° in alternately opposite directions to place one gripper in confronting relation with the winder, then in confronting relation with the fuser, and so on.

The manufacturing line includes conveyor means for delivering unwound armatures in alignment with an elevator. The grippers are alternately located in alignment with the elevator so that they can receive unwound armatures from the elevator. Conveyor means are also provided for conveying wound and fused armatures away from the fuser. The latter conveyor means receives the wound and fused armatures from an elevator which has an upper surface formed as a chuck jaw that supports a wound armature while it is being fused by the fuser.

In operation of an armature manufacturing cell of this invention, an unwound armature is clamped by one of the grippers which at that time is facing the fuser. Thereafter, the turret is rotated to position the unwound armature in alignment with the armature-gripping collet of the armature winder and the gripper is moved to insert the unwound armature in the collet of the armature rotator. At the same time the unwound armature is being delivered to the armature winder, the armature just previously wound by the winder is clamped by the other gripper and delivered to the armature holding means of the fuser. When the fusing operation is completed, the wound and fused armature is lowered by an elevator to the conveyor means which moves the wound and fused armature away from the manufacturing cell.

In one embodiment of this invention, the same conveyor line is used to convey unwound armatures to the manufacturing cell and to remove wound and fused armatures from the manufacturing cell, so that only one elevator is needed to deliver unwound armatures to the grippers of the transfer apparatus and to return the armatures, after being wound and fused, to the conveyor. Advantageously, the elevator also serves to hold a wound armature being fused so that there is no delay in returning armatures to the conveyor at the end of a fusing operation.

In another embodiment, an inclined track system is used to deliver unwound armatures into alignment with a first elevator which is spaced from the fuser and a second elevator is used at the fuser for removing wound and fused parts to the conveyor. This embodiment is inexpensive, provides a highly efficient method of armature winding, and is the presently preferred embodiment of armature manufacturing lines in accordance with this invention.

Either of the foregoing manufacturing lines could have a single manufacturing cell or could have two or more manufacturing cells.

When using grippers to insert an armature into the rotator collet of an armature winder, it is necessary that the grippers be so designed that they do not move in a path obstructed by winding forms or chucks which guide the magnet wires into the armature core slots during the winding operations. In those cases in which the armature cores must be clamped by the transfer grippers, the gripper jaws must be located above and below the armature to avoid contact with the winding forms. However, if the armatures are supported between upper and lower chuck jaws during the fusing operations, the transfer gripper jaws cannot be located above and below the armature at the fuser but must be located on opposite sides of the armature. In accordance with the preferred embodiment of an armature transfer apparatus of this invention, the axis of rotation of the turret is at 45° with respect to vertical and the gripper jaws are so designed that they are horizontally opposed to each other at the fuser and vertically opposed to each other at the winder.

In a modification, which may be used when the transfer grippers are collets which grip armature shafts, the turret rotates about a horizontal axis. In a similar manner, the turret could rotate about a vertical axis.

As a matter of economy, the armature transfer apparatus of this invention is made with a minimum of components that are not commercially available.

Other objects and advantages will become apparent from the following description and the drawings.

BRIEF DESCRIPTION OF THE DRAWINGS

FIG. 1 is a simplified perspective view of a preferred embodiment of an armature manufacturing line in accordance with this invention which includes an armature manufacturing cell and a conveyor.

FIG. 2 is a simplified perspective view of the manufacturing cell of FIG. 1 viewed from the opposite side of the cell from that shown in FIG. 1. The conveyor illustrated in FIG. 1 is not shown in FIG. 2.

FIG. 3 is a fragmentary and partly schematic front elevational view, with parts in cross section, of the armature manufacturing line of FIG. 1. FIG. 3 shows a wound armature in position to be lowered onto an armature support assembly of the conveyor by an elevator and an unwound armature loaded into an armature rotator, schematically indicated by phantom lines, of the armature winder.

FIG. 4 is a fragmentary and partly schematic front elevational view of the armature transfer apparatus of FIG. 1 showing parts at a different point in the operating sequence thereof. FIG. 4 also shows two armatures gripped by the armature transfer apparatus and a portion of the fusing machine of FIG. 1.

FIGS. 5 and 6 are fragmentary perspective views, viewed from respectively different points, of the armature loading and unloading apparatus of FIG. 1.

FIG. 7 is an enlarged, fragmentary perspective view of a portion of a gripper jaw and its support shown within the circular line 7 of FIG. 6.

FIG. 8 is an end elevational view of the armature loading and unloading apparatus of FIG. 1.

FIG. 9 is a simplified plan view, viewed in the direction of arrows 9—9 of FIG. 8, with parts omitted to better show underlying parts of the transfer apparatus.

FIG. 10 is a plan view similar to FIG. 9 but with an additional part added.

FIG. 11 is a plan view of the transfer apparatus of FIG. 1, as viewed in the direction of arrows 11—11 of FIG. 8.

FIG. 14 illustrates the relative position of the wound armature and the gripper jaws before the fusing of the wound armature is begun.

FIG. 15 is a simplified perspective view of a second embodiment of an armature manufacturing line in accordance with this invention.

FIG. 16 is a simplified plan view of a third embodiment of an armature manufacturing line in accordance with this invention.

FIG. 17 is an elevational view of the manufacturing line of FIG. 16.

FIG. 18 is a front elevational view similar to FIG. 3 showing parts of the manufacturing line of FIG. 16.

FIG. 19 is an end elevational view similar to FIG. 8 showing parts of the manufacturing line of FIG. 16.

FIG. 20 is a fragmentary and partly schematic front elevational view of a fourth embodiment of an armature manufacturing line in accordance with this invention which has a second embodiment of a transfer apparatus. FIG. 20 shows a wound armature in position to be lowered onto a conveyor pallet by an elevator and an unwound armature loaded into an armature rotating assembly, schematically indicated by phantom lines, of an armature winding machine.

FIG. 21 is a fragmentary perspective view of a gripper and a gripper support member forming part of the armature transfer apparatus of FIG. 20.

DETAILED DESCRIPTION

Figure 12:
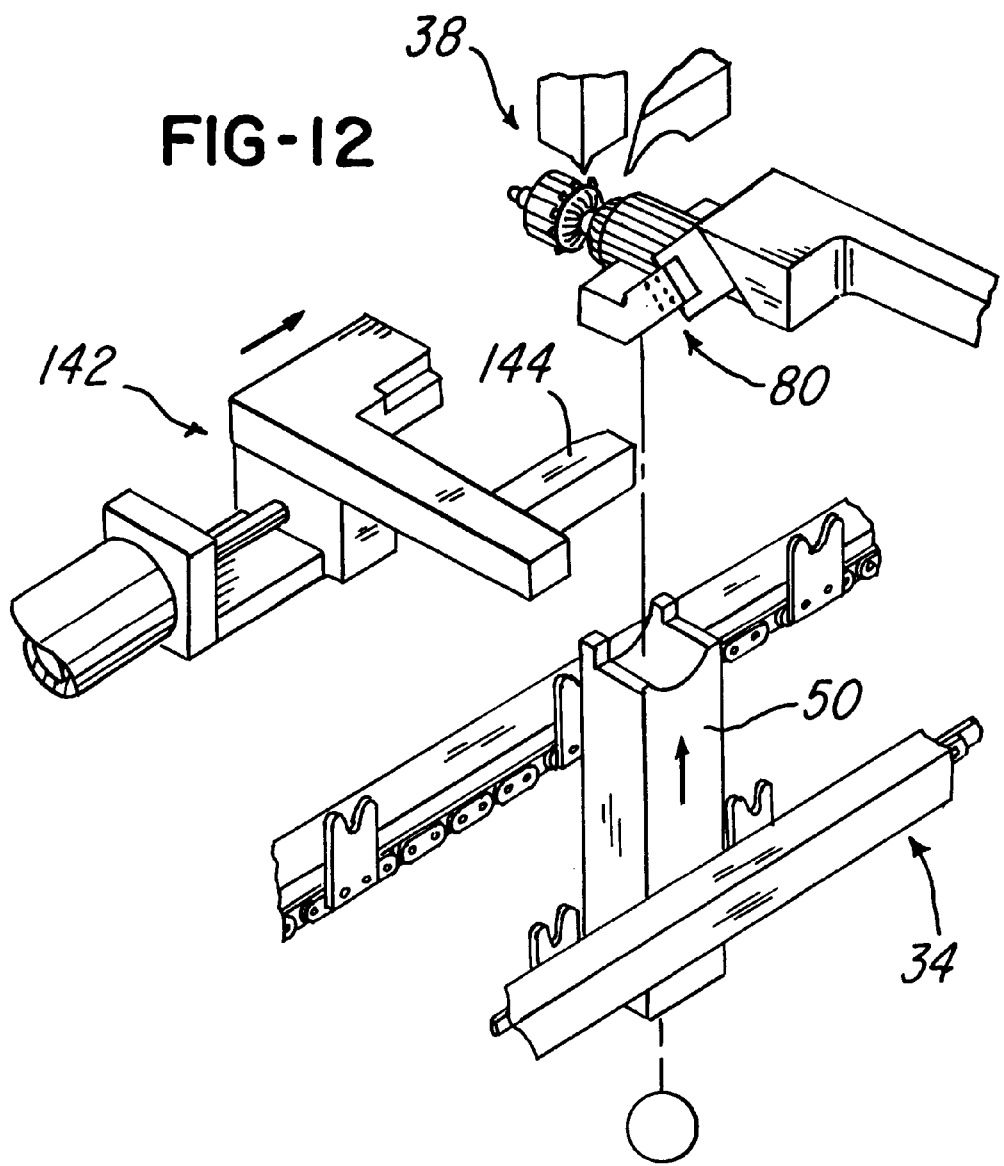
FIG. 12 is an enlarged, fragmentary, partly exploded, perspective view, with parts broken away, of parts of the manufacturing cell and the conveyor of FIG. 1.

A first embodiment of an armature manufacturing line, generally designated 30, is illustrated in FIG. 1. Manufacturing line 30 includes an armature manufacturing cell 32 and a conveyor 34. The manufacturing cell 32 includes an armature winder 36, an armature fuser 38, and an armature transfer mechanism 40. The fuser 38 includes an air operated elevator 42 mounted on the front face of the fuser housing (or, optionally, on the chain conveyor) which is used for lifting unwound armatures off the conveyor 34 and returning wound and fused armatures to the conveyor 34. FIG. 2 shows the manufacturing cell 32 from a perspective different from that of FIG. 1.

Armature winder 36 preferably comprises a double flier armature winding machine which draws magnet wires (not shown) from supply spools (not shown) and, by rotation of the fliers (not shown), forms coils of wire in the slots of an armature. During winding, the armature shaft is gripped by an armature rotator 37 (FIG. 3) which includes a rotatable collet 37A that grips the armature shaft and one or more sleeves 37B that shield the commutator while the coils are being wound. One example of an armature winder of many that could be used with this invention is shown in the aforementioned U.S. Pat. No. 4,633,577. See also U.S. Pat. No. 4,459,742.

Fuser 38 may be of the type disclosed in the aforementioned U.S. Pat. No. 5,525,774, or other suitable apparatus. With reference to FIG. 3, the fuser 38 includes an electrode holder 44, a fusing electrode 46 mounted in the holder 44, an upper chuck jaw 48, and a lower chuck jaw 50 which is formed on the top of the elevator 42. The upper chuck jaw 48 and the lower chuck jaw 50 cooperate to hold and support a wound armature being fused. Also, as is well known, during a fusing operation, an index dog (not shown) in the upper chuck jaw 48 incrementally rotates the armature to serially position the different lead-receiving portions of the commutator in position to be fused.

The conveyor 34 is preferably a chain conveyor but, as will be apparent, other forms of conveyors could be used, such as pallet conveyors.

With reference to FIGS. 2 through 11, the armature transfer apparatus 40 comprises a frame 60 formed from steel tubing and mounted by a pair of mounting pads 62 and suitable fasteners, such as screws or bolts, to the front face of the housing of the armature winder 36. A mounting plate 64 which extends forwardly and downwardly at a 45° angle relative to vertical is affixed to a horizontal portion of the frame 60 by a pair of adjustable bracket assemblies 66, which are made adjustable by providing plates with slots overlying tapped screw-receiving holes, in a well known fashion.

In FIG. 9, much of the mechanism that is located in the front of the mounting plate 64 is not illustrated so that the mounting plate 64 and other parts can be more readily understood. With reference to FIGS. 5, 6 and 8, a rotary actuator 68 is secured to the mounting plate 64 and drives, by means of a timing belt 70 and a pulley 72, a hollow spindle 74 which extends perpendicularly through the mounting plate 64 and has a ring-shaped mounting flange 76 (FIG. 9) on its forward end. A turret plate 78 is affixed to the mounting flange 76 for rotation with the spindle 74 about its 45° oriented axis. Here it should be noted that FIG. 10 is similar to FIG. 9 in that overlying parts are omitted. However, FIG. 10 includes the turret plate 78 which is otherwise difficult to see elsewhere in the drawings. Rotation of the turret plate 78 is limited to 180° in each direction by operation of the rotary air actuator 68 and by a pair of stops 77 cushioned by shock absorbers 77A mounted on the mounting plate 64 and by a stop plate 79 (FIG. 11) affixed to the turret plate 78.

With reference to FIGS. 3 through 5, 8 and 11, a first transfer gripper assembly 80 and an identical, second transfer gripper assembly 82 are movably mounted on the turret plate 78. The first transfer gripper assembly includes an L-shaped carriage 84 mounted on the turret plate 78 for movement in a horizontal direction by a first linear guide 86. The first linear guide 86 includes a trackway 88 affixed to the turret plate 78 and located therein by a shallow channel 88A (FIG. 10) and further includes a movable car 90 to which the carriage 84 is connected, as by bolts (not shown). The second gripper assembly includes an L-shaped carriage 92 connected to a movable car 94 of a second linear guide 96 which also includes a trackway 98 located by a channel 98A (FIG. 10) in the turret plate 78.

The gripper carriages 84 and 92 are driven along their respective trackways 88 and 98 by a respective pair of rodless air actuators 100 and 102 mounted on brackets 104 to the turret plate 78. The rodless air actuators 100 and 102 have respective yokes 106 and 108 to which the gripper carriages 84 and 92 are connected by respective drive members 110 and 112 and ordinary floating couplings 114 and 116 comprising rods surrounded by springs that can move relative to the drive members 110 and 112. These are provided to ensure that armatures can be fully inserted into the winding machine collet 37A. The movements of the gripper assemblies 80 and 82 are provided to enable them to be extended outwardly from the margins of the mounting plate 64 to the winder 36 and the fuser 38, as shown in FIG. 3, and to be retracted within the margins of the mounting plate 64 as shown in FIG. 4. Stops 118 mounted on the mounting plate 64 and shock absorbers 120 mounted on the yokes 106 and 108 are provided to limit the extension of the gripper assemblies 80 and 82. Stops are not required for the retraction of the gripper assemblies 80 and 82 because the stops inherent in the rodless air cylinders 100 and 102 are relied upon. The extended and retracted positions of the gripper assemblies 80 and 82 are sensed by plural proximity sensors 122.

With further regard to the first gripper assembly 80, the outermost, free end of the gripper carriage 84 slants at an angle of 45° outwardly and downwardly in the positions thereof shown in FIGS. 4 and 5, for example. With reference to FIGS. 4 through 7, the gripper assembly 80 further includes a gripper cylinder 130 having a pair of mutually parallel and identical jaws 132 which, in the positions thereof illustrated in FIGS. 4 and 5, are horizontally spaced. The gripper cylinder 130 operates to move the jaws 132 horizontally toward and away from one another in order to grip or release an armature. The second gripper assembly 82 has an identical gripper cylinder, designated 134, with jaws 136. However, because the second gripper assembly 82 is located 180° opposite from the first gripper assembly 80, and due to the 45° tilt of the turret plate 78, the jaws 136 of the second gripper assembly 82 are vertically spaced from each other rather than horizontally spaced. The above-noted 45° slant of the outer end surfaces of the gripper carriages advantageously ensures that the gripper jaws will not be axially aligned with the armatures held either at the winder or at the fuser. Accordingly, armatures with longer shafts can be accommodated.

Air hoses to the various air operated parts and electrical wiring are not illustrated herein to avoid a profusion of lines in the drawings. Air hoses for the air cylinders carried by the turret plate 78 can conveniently be coursed through the hollow spindle 74. A barrier plate 140 may optionally be provided to ensure that air hoses and electrical wiring will not become entangled with the parts that move with the turret plate 78.

Various sequences of operation may be followed using the manufacturing line described above. A preferred sequence is as follows.

With both transfer gripper assemblies 80 and 82 empty and an armature being wound held by the winder collet 37A, the lower chuck jaw 50 at the fuser is elevated to engage and elevate an unwound armature and continues upwardly to press the unwound armature against the upper chuck jaw 48. Assuming that first gripper assembly 80 is facing the fuser and second gripper assembly 82 is facing the winder, the jaws 132 of the first gripper assembly 80, which has previously been moved to its extended position, are actuated to grip the unwound armature. The lower chuck jaw 50 is lowered to a midposition and the first gripper assembly 80 retracted to thereby remove the unwound armature from the chuck jaws 48 and 50. During this time, or shortly thereafter, the winding of the armature gripped by the winder collet 37A is completed, a guard plate forming part of the armature winder is lowered as will readily be understood by those familiar with armature winders, the second gripper assembly 82 is extended to engage the wound armature, the winder collet's grip on the wound part is released, and the second gripper assembly 82 is retracted carrying the wound armature with it.

Figure 13:
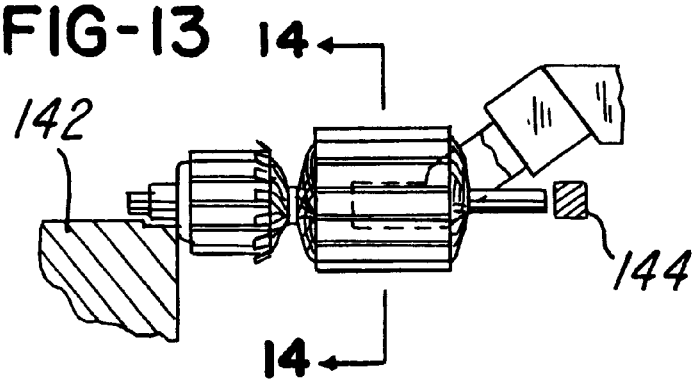
FIG. 13 is a fragmentary, cross-sectional view illustrating parts of the armature manufacturing cell of FIG. 1 used to support and back up the armature shaft of a wound armature being fused, which is also shown in FIG. 13.

With both gripper assemblies 80 and 82 retracted, the transfer turret plate 78 is rotated to reverse the positions of the gripper assemblies 80 and 82. The second gripper assembly 82 extends toward the fuser and the first gripper assembly 80 extends toward the winder. The lower chuck 50 is elevated to engage the wound armature held by the second gripper assembly 82 and the jaws 136 of the second gripper assembly 82 separate to release the wound armature. After the lower chuck 50 is raised, an armature shaft support and tailstock assembly 142 (FIGS. 1, 12 and 13) is extended into a position wherein it supports the armature shaft at its commutator end and also provides a tailstock 144 to prevent the wound armature from moving out of position during the fusing operation. When the assembly 142 is in its operative position, the fusing operation is commenced. The second gripper assembly 82 preferably remains in its extended position to save the cycle time that otherwise would be required to retract and extend the second gripper assembly 82. Substantially simultaneously, the first gripper assembly 80 is extended to insert the shaft of the unwound armature into the winder collet 37A, the winder collet 37A is actuated to grip the unwound part, the jaws 132 of the first gripper assembly 80 are separated to release the unwound armature, the first gripper assembly 80 is retracted, and the aforementioned guard plate is raised to shield the winding machine fliers. The wound armature is now fused and the unwound armature is now wound.

After the wound armature is fully fused, the lower chuck 50 is completely lowered to deposit the wound and fused armature onto the conveyor 34, the conveyor 34 is indexed to bring a new unwound armature into alignment with the lower chuck jaw 50, and the lower chuck 50 is elevated to begin a repetition of the foregoing steps. As the foregoing cycle of operations is repeated a second time, the transfer turret plate 78 rotates in a direction opposite to its direction of rotation during the first cycle, as evident from the foregoing description. It will be noted that each operating cycle ends with the entire system positioned and operable to repeat the cycle so that operation of the system can continue for an indefinite number of cycles without interruptions between cycles.

Figure 14:
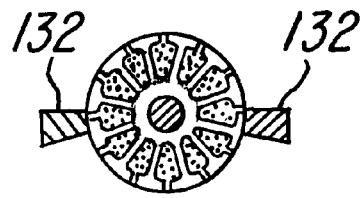
FIG. 14 is a cross-sectional view of a wound armature and of gripper jaws engaged therewith taken along the section line 14—14 of FIG. 13.

With reference to FIG. 14, it will be recognized that a gripper assembly 80 or 82, when positioned at the fuser cannot, without the possibility of damage to the jaw or the armature, move an armature into and out of engagement with the upper chuck jaw 48 if the armature is engaged with the upper jaw 48. Accordingly, the gripper assemblies 80 and 82 are designed to hold the armatures slightly below the upper chuck jaw 48. The gripper jaws 132 and 136 can still reliably clamp the armatures held in the chuck jaws because there is a degree of flexibility in the mounting of the gripper assemblies 80 and 82. Furthermore, the confronting surfaces of the gripper jaws 132 and 136 are concavely curved, as shown in FIG. 14, to mate with the curvature of the armature core. When they first engage an unwound armature held by the chuck jaws 48 and 50, the curved gripper jaws 132 or 136 self-center on the armature core due to the curvature of their core-engaging surfaces.

Several of the subassemblies of the armature transfer apparatus 40 are readily commercially available. These include the following:

The rodless air cylinders 100 and 102 are magnetically coupled DGO rodless air cylinders which may be purchased from Festo Corporation of Hauppauge, N.Y.

The rotary actuator 68 is a Type DRQ rack and pinion pneumatic rotary actuator which is also available from Festo Corporation.

The linear guides 86 and 96 are Type HSR, THK LM ball bearing guides, available from THK America, Inc. of Elk Grove, Ill.

Festo type YSR hydraulic shock absorbers can be used for the shock absorbers 77A and 120.

The gripper cylinders 130 and 134 may be air operated parallel grippers available form Robohand of Monroe, Conn.

Other sources are also readily available for components equivalent to some of the foregoing components.

Variations in armature manufacturing lines in accordance with this invention can readily be imagined. For example, one or more manufacturing cells at the beginning of a line could have an armature winder but no armature fuser. Armatures wound by such manufacturing cells could be fused at a downstream manufacturing cell having both a winder and a fuser. In such case, the downstream cell would operate such that the fuser could fuse two or more armatures while the winder is winding one armature. Of course, the operations of the elevator and the conveyor would have to be modified to accommodate the additional armatures to be fused. The sequence of operation of the downstream manufacturing cell could include the following steps:

A. After the winding of an armature at the downstream cell, and with the armature grippers retracted, the load/unload turret is rotated and the grippers are extended to present an unwound armature to the winder and the newly wound armature to the fuser.

B. As the unwound armature is being wound, the fuser fuses the newly wound armature after which the elevator lowers the newly fused armature to the conveyor seat through which the elevator extends.

C. The conveyor's armature seats are incrementally moved to place an armature which was wound at an upstream cell into alignment with the elevator at the downstream cell. That armature is elevated, fused, and lowered back onto its conveyor seat.

D. The conveyor's armature seats are incrementally moved to place an unwound armature into alignment with the elevator of the downstream cell, and the unwound armature is elevated and gripped by the load/unload gripper that is then aligned with the fuser.

E. The foregoing operations are repeated.

As will be readily understood by controls engineers familiar with manufacturing systems utilizing workpiece conveyors, the operations of the various elements of this invention, including the conveyors and the elevators, may be controlled by conventional machine logic controls systems.

FIG. 15 illustrates how three identical manufacturing cells 301, 302 and 303 can be used in an armature manufacturing line. The three cells desirably operate in unison with the conveyor 304 indexing through a sufficient number of steps to place unwound armatures at the fusing station of each of the cells 301, 302, and 303 after each time newly wound and fused armatures are deposited on the conveyor.

FIGS. 16 through 19 show a presently preferred armature winding line 310, having three manufacturing cells 312, 314, and 316, each of which can have the same winder 36, fuser 38, and armature transfer apparatus 40 as in the embodiment shown in FIGS. 1 through 14, but additionally including an inclined track system 318 of conventional design which feeds unwound armatures to pick up points aligned respectively with the gripper assemblies 80 of the three armature transfer apparatus 40 when they are aligned with the fusers 38 and are in their retracted positions. Unwound armatures are delivered to each of the retracted gripper assemblies by an armature feed elevator 320 and wound and fused armatures are deposited on an exit conveyor 322, which is preferably a chain conveyor. Operation of the manufacturing line of FIGS. 16 through 19 is readily apparent from the foregoing description. The operations of each manufacturing cell may be identical to the operations described above, except that the unwound armatures are elevated to a gripper assembly 80 or 82, as the case may be, after the gripper assembly 80 or 82 is retracted following delivery of a wound armature to the fuser 38. It will be noted that the conveyor 322 is marked with arrows to indicate direction of movement of the parts. The opposite direction of movement could equally be provided.

FIGS. 20 and 21 show a manufacturing line including a manufacturing cell 328 with a second embodiment of an armature transfer apparatus 330 which has turret plate 332 that rotates about a horizontal axis. This is possible because the gripper assemblies 80 and 82 are replaced by gripper assemblies 334 that are sized to grip the armature shafts and, therefore, do not need to be reoriented when moving between the winder and the fuser. FIG. 20 also shows a fuser having a rotating shaft collet 336 that is used to support armatures during fusing operations. In operation, to remove a wound and fused armature, the appropriate gripper assembly 334 must regrip the wound and fused armature so that the fuser collet 336 can be retracted before the fuser elevator moves to support and lower the wound and fused armature. The same sequence of operations would have to occur with the armature transfer apparatus 40 if the upper chuck 48 were replaced by a fuser collet.

FIG. 20 also shows a pallet conveyor assembly represented by an armature support pallet 340 which is located to supply an unwound armature to the manufacturing cell 328 and to receive a wound and fused armature from the manufacturing cell 328.

It will be noted that the axes of the armatures gripped by the winder collet and those gripped by the fuser chuck or collet are invariably parallel in the embodiments illustrated herein. However, there would be occasions in which their axes could be coaxial in which event the transfer grippers hold the armatures with their shafts extending horizontally through the axis of rotation of the turret.

In the operation of fusers, different weld schedules are often used for different commutator tangs or slots, depending upon the order in which the tangs are fused. For example, a first tang to be fused at the outset of a fusing operation may be fused to a coil lead wire using a different schedule of welding pressures or welding voltage, amperage or temperature curves than the weld schedules used for the second and third tangs to be fused. Furthermore, optimal fuses of start and finish wire tangs or slots may require weld schedules different from the other tangs or slots. An advantage inherent in the operation of the apparatus of this invention is that the circumferential or rotational orientations of the armatures when loaded into the fusers bear a fixed relationship with the orientations of the armatures at the completion of the winding operations. Accordingly, the circumferential locations of the start and finish wire tangs or slots are predetermined at the completion of the winding operations. Because the armatures never leave the grasp of the armature transfer apparatus after being wound until the armatures are loaded into a fuser, the locations of the start and finish wire tangs or slots at the outset of the fusing operations are automatically predetermined. Accordingly, the points in time during a welding sequence in which the start and finish wire tangs or slots are in a position to be fused is predetermined and the weld controller can be programmed in advance to produce the proper schedule for each commutator tang or slot.

Although the presently preferred embodiments of this invention have been described, it will be understood that within the purview of the invention various changes may be made within the scope of the following claims. As an obvious modification, the conveyors which remove the wound and fused parts could be optionally located above the manufacturing cell so that the elevator which handles the wound and fused armatures would raise them above the fuser.

Having thus described our invention, we claim:

1. A workpiece transfer apparatus comprising:
   a turret plate rotatable about an axis of rotation extending at 45 degrees relative to vertical;
   a drive actuator for rotating said turret plate; and
   a workpiece gripper mounted on said turret plate having a pair of parallel-extending, opposed gripper jaws, wherein said gripper jaws are mutually spaced in a first plane when said turret plate is in a first rotational position and wherein said gripper jaws are mutually spaced in a second plane perpendicular to said first plane when said turret plate is rotated through 180 degrees to a second rotational position.

2. The workpiece transfer apparatus of claim 1 wherein said first plane is horizontal and said second plane is vertical.

3. The workpiece transfer apparatus of claim 1 wherein said gripper is slidably mounted on said turret plate and movable between a first position at a first distance from said axis of rotation of said turret plate and a second position at a second, greater distance from said axis of rotation.

4. The workpiece transfer apparatus of claim 3 further comprising a carriage slidably mounted on said turret plate, said gripper being mounted on said carriage, and an air actuator engaged with said carriage for moving said carriage and thereby said gripper between said first position of said gripper and said second position of said gripper.

5. The workpiece transfer apparatus of claim 4 further comprising a carriage stop member mounted on said turret plate that engages said carriage to limit sliding movement of said carriage.

6. The workpiece transfer apparatus of claim 5 wherein said carriage stop member includes a shock absorbing mechanism.

7. The workpiece transfer apparatus of claim 1 further comprising a turret plate stop member located at a fixed location relative to said axis of rotation and engaging said turret member when rotated by said drive actuator, thereby limiting rotational movement of said turret plate.

8. The workpiece transfer apparatus of claim 7 wherein said turret plate stop member includes a shock absorbing mechanism.

9. The workpiece transfer apparatus of claim 1 further comprising a second workpiece gripper mounted on said turret plate having a pair of parallel-extending, opposed gripper jaws, wherein said gripper jaws of said second gripper are mutually spaced in said second plane when said turret plate is in said first rotational position and wherein said gripper jaws of said second gripper are mutually spaced in said first plane when said turret plate is rotated through 180 degrees to said second rotational position.

10. A workpiece transfer apparatus comprising:
    a turret plate rotatable about an axis which extends relative to vertical at a nonzero angle less than ninety degrees;
    a drive actuator for rotating said turret plate; and
    a workpiece gripper mounted on said turret plate having a pair of parallel-extending, opposed gripper jaws, wherein said gripper jaws are mutually spaced in a first plane when said turret plate is in a first rotational position and wherein said gripper jaws are mutually spaced in a second plane different from said first plane when said turret plate is rotated through 180 degrees to a second rotational position.

11. The workpiece transfer apparatus of claim 10 further comprising a second workpiece gripper mounted on said turret plate having a pair of parallel-extending, opposed gripper jaws, wherein said gripper jaws of said second gripper are mutually spaced in said second plane when said turret plate is in said first rotational position and wherein said gripper jaws of said second gripper are mutually spaced in said first plane when said turret plate is rotated through 180 degrees to said second rotational position.

* * * * *